United States Patent Office 3,504,086
Patented Mar. 31, 1970

---

3,504,086
PROCESS FOR KILLING NEMATODES USING
SULFENYL PHOSPHORYL AMIDATES
Paul C. Aichenegg, Prairie Village, Kans., assignor to
Chemagro Corporation, Kansas City, Mo., a corporation of New York
No Drawing. Filed Nov. 29, 1966, Ser. No. 597,534
Int. Cl. A01n 9/36
U.S. Cl. 424—219                10 Claims

---

ABSTRACT OF THE DISCLOSURE

Trihaloethyl sulfenyl phosphor bis-amidates and dihalovinyl sulfenyl phosphor bis-amidates are prepared by reaction of the corresponding trihaloethyl sulfenyl phosphoryl dichloride or dihalovinyl sulfenyl phosphoryl dichloride with a primary or secondary aryl or alkyl amine or with aziridine. The amidates formed are useful as nematocides and fungicides. The preferred compound is 2,2-dichlorovinyl sulfenyl phosphor-N-monoisopropyl bis-amidate. The compounds of the present invention are prepared by starting with the trihaloethyl or dihalovinyl sulfenyl phosphoryl dihalides prepared in Aichenegg et al. application Ser. No. 553,022, filed May 26, 1966 now U.S. Patent No. 3,454,679.

---

The present invention relates to the preparation of sulfenyl phosphor bis-amidates and their use as pesticides.

It is an object of the present invention to prepare novel sulfenyl phosphor bis-amidates.

Another object is to kill nematodes.

A further object is to kill fungi.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the formulae

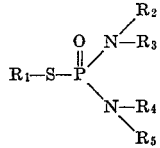

and,

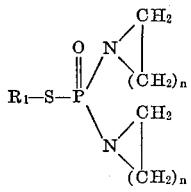

where $R_1$ is trihaloethyl or dihalovinyl, $R_2$ and $R_4$ are alkyl, aryl, or haloaryl, $R_3$ and $R_5$ are hydrogen, alkyl, aryl or haloaryl and $n$ is an integer of 1 to 5. Preferably, $R_2$ and $R_4$ are lower alkyl and $R_3$ and $R_5$ are hydrogen. The halogen atoms have an atomic weight of 35 to 80, i.e., they are chlorine or bromine, and preferably are chlorine.

The compounds of the present invention are prepared by reacting a trihaloethyl sulfenyl phosphoryl dihalide or dihalovinyl sulfenyl phosphoryl dihalide with a primary or secondary amine in the presence of either an excess of the amine or of a tertiary amine to remove the HCl formed.

The general procedure in the following examples was to dissolve 10 to 20 grams (0.05 to 0.1 mole) of the chosen phosphoryl chloride in 10 to 15 times its weight of an inert solvent (or mixture of solvents) such as petroleum ether, benzene, or chloroform. Then a 4-molar quantity (per mole of phosphoryl chloride) of the primary or secondary amine was added with cooling and stirring at 10 to 25° C. Alternatively, a mixture of two molar equivalents of the chosen amine and a 2-molar quantity of triethyl amine also has been used.

The reaction mixture was stirred at room temperature for about 2 hours to overnight (16 hours) to insure completion of the reaction. The reaction mixture was then shaken successively with water, dilute hydrochloric acid and dilute sodium bicarbonate, the organic layer dried over anhydrous magnesium sulfate, the clear filtrate freed from solvent by evaporation and finally in high vacuum.

The solid products were recrystallized from petroleum ether while the liquid products were not further purified.

The starting phosphoryl dihalides are prepared in the manner set forth in Aichenegg et al. application Ser. No. 553,022, filed May 26, 1966 now U.S. Patent No. 3,454,679, and include 1,2,2-trichloroethyl sulfenyl phosphoryl dichloride, 2,2,2-trichloroethyl sulfenyl phosphoryl dichloride, 2,2-dichlorovinyl sulfenyl phosphoryl dichloride, 1,2-dichlorovinyl sulfenyl phosphoryl dichloride, 1,2,2-tribromoethyl sulfenyl phosphoryl dibromide and 2,2-dibromovinyl sulfenyl phosphoryl dibromide.

Examples of suitable primary and secondary amines include dimethyl amine, diethyl amine, isopropyl amine, diisopropyl amine, aziridine (ethylene imine), dipropyl amine, dibutyl amine, diamyl amine, dioctyl amine, diisobutyl amine, isobutyl amine, hexyl amine, cyclohexyl amine, methyl amine, ethyl amine, butyl amine, amyl amine, piperidine, pyrrolidine, aniline, N-methyl aniline, o-toluidine, p-toluidine, p-chloroaniline, o-chloroaniline, m-chloroaniline, α-naphthylamine, β-naphthylamine, p-bromoaniline and N-butylaniline.

Examples of compounds within the present invention are 1,2,2-trichloroethyl sulfenyl phosphor-N,N-dimethyl-bis-amidate,
1,2,2-trichloroethyl sulfenyl phosphor-N,N-diethyl-bis-amidate,
1,2,2-trichloroethyl sulfenyl phosphor-N,N-di-isopropyl-bis-amidate,
1,2,2-tribromoethyl sulfenyl phosphor-N,N-diethyl-bis-amidate,
1,2,2-trichloroethyl sulfenyl phosphor-N,N-dipropyl-bis-amidate,
1,2,2-trichloroethyl sulfenyl phosphor-N,N-dibutyl-bis-amidate,
1,2,2-trichloroethyl sulfenyl phosphor-N,N-di-isobutyl-bis-amidate,
1,2,2-trichloroethyl sulfenyl phosphor-N,N-diamyl-bis-amidate,
1,2,2-trichloroethyl sulfenyl phosphor-N,N-dicyclohexyl-bis-amidate,
1,2,2-trichloroethyl sulfenyl phosphor-N,N-dioctyl-bis-amidate,
1,2,2-trichloroethyl sulfenyl phosphor-N-ethyl-N-isopropyl-bis-amidate,
1,2,2-trichloroethyl sulfenyl phosphor-N,N-diphenyl-bis-amidate,
1,2,2-trichloroethyl sulfenyl phosphor-N,N-di-p-methyl-phenyl-bis-amidate, 1,2,2-trichloroethyl sulfenyl phosphor-N,N-di-o-chlorophenyl-bis-amidate,
1,2,2-trichloroethyl sulfenyl phosphor-N,N-di-α-naphthyl-bis-amidate,
1,2,2-trichloroethyl sulfenyl phosphor-N-propyl-N-phenyl-bis-amidate,
1,2,2-trichloroethyl sulfenyl phosphor-N-methyl-bis-amidate,
1,2,2-trichloroethyl sulfenyl phosphor-N-ethyl-bis-amidate,
1,2,2-trichloroethyl sulfenyl phosphor-N-propyl-bis-amidate,
1,2,2-trichloroethyl sulfenyl phosphor-N-isopropyl-bis-amidate,
1,2,2-trichloroethyl sulfenyl phosphor-N-butyl-bis-amidate,
1,2,2-trichloroethyl sulfenyl phosphor-N-octyl-bis-amidate,
1,2,2-trichloroethyl sulfenyl phosphor-N-phenyl-bis-amidate,
1,2,2-trichloroethyl sulfenyl phosphor-N-m-methylphenyl-bis-amidate,
1,2,2-trichloroethyl sulfenyl phosphor-N-butylphenyl-bis-amidate,
1,2,2-trichloroethyl sulfenyl phosphor-N-p-chlorophenyl-bis-amidate,
1,2,2-trichloroethyl sulfenyl-N-bis-aziridinyl phosphine oxide,
1,2,2-trichloroethyl sulfenyl-N-bis-pyrrolidinyl phosphine oxide,
1,2,2-trichloroethyl sulfenyl-N-bis-piperidinyl phosphine oxide,
2,2,2-trichloroethyl sulfenyl phosphor-N,N-dimethyl-bis-amidate,
2,2,2-trichloroethyl sulfenyl phosphor-N,N-diethyl-bis-amidate,
2,2,2-trichloroethyl sulfenyl phosphor-N,N-di-isopropyl-bis-amidate,
2,2,2-trichloroethyl sulfenyl phosphor-N,N-dipropyl-bis-amidate,
2,2,2-trichloroethyl sulfenyl phosphor-N,N-dibutyl-bis-amidate,
2,2,2-trichloroethyl sulfenyl phosphor-N,N-di secondary butyl-bis-amidate,
2,2,2-trichloroethyl sulfenyl phosphoryl-N,N-dihexyl-bis-amidate,
2,2,2-trichloroethyl sulfenyl phosphor-N,N-dioctyl-bis-amidate,
2,2,2-trichloroethyl sulfenyl phosphor-N-propyl-N-butyl-bis-amidate,
2,2,2-trichloroethyl sulfenyl phosphor-N,N-diphenyl-bis-amidate,
2,2,2-trichloroethyl sulfenyl phosphor-N,N-di-o-methyl-phenyl-bis-amidate,
2,2,2-trichloroethyl sulfenyl phosphor-N,N-di-p-bromo-phenyl-bis-amidate,
2,2,2-trichloroethyl sulfenyl phosphor-N,N-β-naphthyl-bis-amidate,
2,2,2-trichloroethyl sulfenyl phosphor-N-isopropyl-N-p-methylphenyl-bis-amidate,
2,2,2-trichloroethyl sulfenyl phosphor-N-methyl-bis-amidate,
2,2,2-trichloroethyl sulfenyl phosphor-N-ethyl-bis-amidate,
2,2,2-trichloroethyl sulfenyl phosphor-N-propyl-bis-amidate,
2,2,2-trichloroethyl sulfenyl phosphor-N-isopropyl-bis-amidate,
2,2,2-trichloroethyl sulfenyl phosphor-N-butyl-bis-amidate,
2,2,2-trichloroethyl sulfenyl phosphor-N-isoamyl-bis-amidate,
2,2,2-trichloroethyl sulfenyl phosphor-N-octyl-bis-amidate,
2,2,2-trichloroethyl sulfenyl phosphor-N-phenyl-bis-amidate,
2,2,2-trichloroethyl sulfenyl phosphor-N-p-ethylphenyl-bis-amidate,
2,2,2-trichloroethyl sulfenyl phosphor-N-bis-aziridinyl phosphine oxide,
2,2,2-trichloroethyl sulfenyl phosphor-N-bis-piperidinyl phosphine oxide,
1,2-dichlorovinyl sulfenyl phosphor-N,N1diethyl-bis-amidate,
1,2-dichlorovinyl sulfenyl phosphor-N-isopropyl-bis-amidate,
2,2-dibromovinyl sulfenyl phosphor-N,N-dipropyl-bis-amidate,
2,2-dichlorovinyl sulfenyl phosphor-N,N-dimethyl-bis-amidate,
2,2-dichlorovinyl sulfenyl phosphor-N,N-diethyl-bis-amidate,
2,2-dichlorovinyl sulfenyl phosphor-N,N-dipropyl-bis-amidate,
2,2-dichlorovinyl sulfenyl phosphor-N,N-diisopropyl-bis-amidate,
2,2-dichlorovinyl sulfenyl phosphor-N,N-dibutyl-bis-amidate,
2,2-dichlorovinyl sulfenyl phosphor-N,N-diamyl-bis-amidate,
2,2-dichlorovinyl sulfenyl phosphor-N,N-diisooctyl-bis-amidate,
2,2-dichlorovinyl sulfenyl phosphor-N,N-diphenyl-bis-amidate,
2,2-dichlorovinyl sulfenyl phosphor-N-methyl-N-butyl-bis-amidate,
2,2-dichlorovinyl sulfenyl phosphor-N,N-di-p-methyl-phenyl-bis-amidate,
2,2-dichlorovinyl sulfenyl phosphor-N,N-di-p-butylphenyl-bis-amidate,
2,2-dichlorovinyl sulfenyl phosphor-N,N-di-p-chloro-phenyl-bis-amidate,
2,2-dichlorovinyl sulfenyl phosphor-N,N-di-β-naphthyl-bis-amidate,
2,2-dichlorovinyl sulfenyl phosphor-N,N-di-o-bromo-phenyl-bis-amidate,
2,2-dichlorovinyl sulfenyl phosphor-N-methyl-bis-amidate,
2,2-dichlorovinyl sulfenyl phosphor-N-ethyl-bis-amidate,
2,2-dichlorovinyl sulfenyl phosphor-N-propyl-bis-amidate,
2,2-dichlorovinyl sulfenyl phosphor-N-isopropyl-bis-amidate,
2,2-dichlorovinyl sulfenyl phosphor-N-isobutyl-bis-amidate,
2,2-dichlorovinyl sulfenyl phosphor-N-secondary butyl-bis-amidate,
2,2-dichlorovinyl sulfenyl phosphor-N-butyl-bis-amidate,
2,2-dichlorovinyl sulfenyl phosphor-N-amyl-bis-amidate,
2,2-dichlorovinyl sulfenyl phosphor-N-cyclohexyl-bis-amidate,
2,2-dichlorovinyl sulfenyl phosphor-N-octyl-bis-amidate,
2,2-dichlorovinyl sulfenyl phosphor-N-phenyl-bis-amidate,
2,2-dichlorovinyl sulfenyl phosphor-N-p-methylphenyl-bis-amidate,
2,2-dichlorovinyl sulfenyl phosphor-N-p-chlorophenyl-bis-amidate,
2,2-dichlorovinyl sulfenyl phosphor-N-α-naphthyl-bis-amidate,
2,2-dichlorovinyl sulfenyl-N-bis-aziridinyl-phosphine oxide,
2,2-dichlorovinyl sulfenyl-N-bis-piperidinyl-phosphine oxide, and
2,2-dichlorovinyl sulfenyl-N-bis-pyrrolidinyl-phosphine oxide.

Table 1 below summarizes the identification of some of the compounds within the present invention which are prepared and employed in the subsequent examples.

TABLE 1

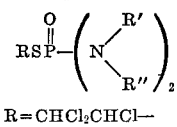

R=CHCl$_2$CHCl—

| R' | R'' | Compound | Example |
|---|---|---|---|
| Me | Me | 7050 | 1 |
| Et | Et | 7030 | 2 |
| H | iPro | 7057 | 3 |
| iPro | iPro | 7063 | 4 |
| —CH$_2$— | —CH$_2$— | 7031 | 5 |

R=CCl$_3$CH$_2$—

| R' | R'' | Compound | Example |
|---|---|---|---|
| Me | Me | 6718 | 6 |
| Et | Et | 7051 | 7 |
| H | iPro | 7058 | 8 |
| iPro | iPro | 7064 | 9 |
| —CH$_2$— | —CH$_2$— | 7052 | 10 |

R=CCl$_2$=CH—

| R' | R'' | Compound | Example |
|---|---|---|---|
| Me | Me | 7053 | 11 |
| Et | Et | 7054 | 12 |
| H | iPro | 7059 | 13 |
| iPro | iPro | 7065 | 14 |
| —CH$_2$— | —CH$_2$ | 7055 | 15 |

Unless otherwise indicated, all parts and percentages are by weight.

EXAMPLE 1

Into 15 grams (0.053 mole) of 1,2,2-trichloroethyl sulfenyl phosphoryl dichloride in 150 ml. of benzene there were introduced 9.55 grams (0.212 mole) of dimethylamine gas with cooling at 20 to 25° C. The mixture was stirred at room temperature for several hours, shaken successively with water, dilute hydrochloric acid and dilute sodium bicarbonate solutions, the organic layer dried over anhydrous magnesium sulfate and the clear filtrate freed from solvent by evaporation. There were obtained 15.5 grams (97.5% yield) of 1,2,2-trichloroethyl sulfenyl phosphor-N,N-dimethyl-bis-amidate (Compound 7050) as a dark oil, $n_D^{25}$ 1.5175; S 10.4% (theory 10.65%), P 9.77% (theory 10.32%).

EXAMPLE 2

To 15 grams of 1,2,2-trichloroethyl sulfenyl phosphoryl dichloride in 150 ml. of petroleum ether there were added 15.6 grams (0.212 mole) of diethylamine dropwise at 20° C. with occasional cooling. The mixture was stirred at room temperature for several hours and purified as in Example 1 to obtain 13.5 grams (71.5% yield) of 1,2,2-trichloroethyl sulfenyl phosphor-N,N-diethyl-bis-amidate (Compound 7030) as an oil, $n_D^{25}$ 1.5390, Cl 30.4% (theory 30.2%).

EXAMPLE 3

To 15 grams of 1,2,2-trichloroethyl sulfenyl phosphoryl dichloride in 200 ml. of petroleum ether there were added 12.5 grams (0.212 mole) of isopropyl amine at 20 to 25° C. with cooling. The mixture was stirred at room temperature for several hours and purified as in Example 1 to obtain 14.1 grams (81.5% yield) of 1,2,2-trichloroethyl sulfenyl phosphor-N-mono-isopropyl-bis - amidate (Compound 7057) as a white solid, M.P. 122° C.

EXAMPLE 4

To 15 grams of 1,2,2-trichloroethyl sulfenyl phosphoryl dichloride in 150 ml. of petroleum ether there were added 21.5 grams (0.214 mole) of diisopropyl amine at 20 to 25° C. with cooling. The mixture was stirred at room temperature for several hours and purified as in Example 1 to obtain 10 grams (46.5% yield) of 1,2,2-trichloroethyl sulfenyl phosphor-N,N-diisopropyl - bis - amidate (Compound 7063) as a dark oil.

EXAMPLE 5

To 15 grams of 1,2,2-trichloroethyl sulfenyl phosphoryl dichloride in 200 ml. of petroleum ether at room temperature there was added a mixture of 4.55 grams (0.106 mole) of ethyleneimine and 10.7 grams (0.106 mole) of triethylamine dropwise with cooling to 10 to 15° C. The mixture was allowed to reach room temperature, was stirred for several hours and purified as in Example 1 to obtain 15.2 grams (97.5% yield) of 1,2,2-trichloroethyl sulfenyl-N-bis-aziridinyl - phosphine oxide (Compound 7031) as an oil, $n_D^{25}$ 1.5477.

EXAMPLE 6

Into 7 grams (0.0248 mole) of 2,2,2-trichloroethyl sulfenyl phosphoryl dichloride in 150 ml. of Skellysolve B (volatile aliphatic hydrocarbon solvent) there were introduced with stirring and cooling at 10 to 15° C. 4.5 grams (slight excess over 0.1 mole or 4 equivalents) of dimethylamine. The mixture was stirred one further hour at room temperature, washed with dilute hydrochloric acid, dilute sodium bicarbonate, water, dried over anhydrous magnesium sulfate and the solvent removed in high vacuum to give 6.9 grams (93% yield) of 2,2,2-trichloroethyl sulfenyl phosphor - N,N - dimethyl - bis-amidate (Compound 6718) as a yellow oil, $n_D^{25}$ 1.5277, Cl 34.2% (theory 35.6%), S 10.4% (theory 10.7%), P 10.2% (theory 10.35%).

EXAMPLE 7

To 15 grams (0.053 mole) of 2,2,2-trichloroethyl sulfenyl phosphoryl dichloride in 200 ml. of petroleum ether there was added dropwise a mixture of 7.8 grams (0.106 mole) of diethylamine and 10.6 grams (0.106 mole) of triethylamine at 10 to 15° C. with cooling. The mixture was stirred for several hours at room temperature and purified as in Example 6 to obtain 15.1 grams (96% yield) of 2,2,2-trichloroethyl sulfenyl phosphor-N,N-diethyl-bis-amidate (Compound 7051) as a dark oil, $n_D^{25}$ 1.5783.

EXAMPLE 8

To 15 grams of 2,2,2-trichloroethyl sulfenyl phosphoryl dichloride in 200 ml. of petroleum ether there were added dropwise 12.5 grams (0.214 mole) of isopropylamine at 20 to 25° C. with cooling. The mixture was stirred for several hours at room temperature and purified as in Example 6 to obtain 13.1 grams (76% yield) of 2,2,2-trichloroethyl sulfenyl phosphor-N-mono-isopropyl - bis-amidate (Compound 7058) as a white solid, M.P. 128° C.

EXAMPLE 9

To 15 grams of 2,2,2-trichloroethyl sulfenyl phosphoryl dichloride in 150 ml. of petroleum ether there were added dropwise at room temperature 21.5 grams (0.214 mole) of di-isopropylamine. The mixture was stirred for several hours and purified as in Example 6 to obtain 2,2,2-trichloroethyl sulfenyl phosphor-N,N-di - isopropyl-bis-amidate (Compound 7064) as a dark oil.

EXAMPLE 10

To 15 grams of 2,2,2-trichloroethyl sulfenyl phosphoryl dichloride in 200 ml. of petroleum ether there was added dropwise with cooling to 10 to 15° C. a mixture of 4.55 grams (0.106 mole) of aziridine (ethylene-imine) and 10.6 grams (0.106 mole) of triethyl amine. The mixture obtained was stirred for several hours at room temperature and purified as in Example 6 to obtain 15.1 grams (87% yield) of 2,2,2-trichloroethyl sulfenyl-N-bis-aziridinyl-phosphine oxide (Compound 7052) as a white solid, M.P. 60° C.; Cl 37.7% (theory 36.0%), S 10.7% (theory 10.8%), P 9.8% (theory 10.5%).

EXAMPLE 11

To 13 grams (0.053 mole) of 2,2-dichlorovinyl sulfenyl phosphoryl dichloride in 150 ml. of dry benzene there were added 12 grams (0.212 mole) of di-methylamine gas over a one hour period with cooling at 25° C. The mixture was stirred for several hours at room temperature and purified as in Example 6 to obtain 11.1 grams (90% yield) of 2,2-dichlorovinyl sulfenyl phosphor-N,N-dimethyl-bis-amidate as a dark liquid, $n_D^{25}$ 1.5315.

EXAMPLE 12

To 13 grams of 2,2-dichlorovinyl sulfenyl phosphoryl dichloride in 200 ml. of petroleum ether there were added 15.6 grams (0.212 mole) of diethylamine at 10 to 15° C. with cooling. The mixture was stirred for several hours at room temperature and purified as in Example 6 to obtain 14.8 grams (88% yield) of 2,2-dichlorovinyl sulfenyl phosphor - N,N - diethyl-bis-amidate as a dark oil, $n_D^{25}$ 1.5871.

EXAMPLE 13

To 13 grams of 2,2-dichlorovinyl sulfenyl phosphoryl dichloride in 200 ml. of petroleum ether there were added 12.5 grams (0.212 mole) of monoisopropylamine at 20 to 25° C. with cooling. The mixture was stirred for several hours at room temperature and purified as in Example 6 to obtain 12.5 grams (81% yield) of 2,2-dichlorovinyl sulfenyl phosphor - N - mono-isopropyl-bis-amidate (Compound 7059) as a white solid, M.P. 94° C.

In a repeat run there were obtained 13 grams of Compound 7059 which were recrystallized for petroleum ether to yield 12.5 grams of purified product, M.P. 94 to 95° C.; Cl 24.4% (theory 24.4%); S 11.4% (theory 11.0%), P 11.0% (theory 10.6%).

EXAMPLE 14

To 13 grams of 2,2-dichlorovinyl sulfenyl phosphoryl dichloride in 200 ml. of petroleum ether there were added 21.5 grams (0.214 mole) of di-iso-propylamine at 20 to 25° C with cooling. The mixture was stirred for several hours at room temperature and purified as in Example 6 to obtain 10 grams (53% yield) of 2,2-dichlorovinyl sulfenyl phosphor-N,N-di-isopropyl-bis-amidate (Compound 7065) as a dark liquid.

EXAMPLE 15

To 13 grams of 2,2-dichlorovinyl sulfenyl phosphoryl dichloride in 200 ml. of petroleum ether there was added a mixture of 4.55 grams (0.106 mole) of aziridine and 10.6 grams (0.106 mole) of triethyl amine at 10 to 15° C. with cooling. The mixture was stirred for several hours at room temperature and purified as in Example 6 to obtain 8.1 grams (59% yield) of 2,2-dichlorovinyl sulfenyl-N-bis-aziridinylphosphine oxide (Compound 7055) as a dark liquid.

The compounds of the present invention are useful as fungicides as shown in agar plate, soil fungicide and spore germination tests, showed mild desiccant activity on cotton and also showed mild pre- and post-herbicidal activity on oats, sugar beets, radish, flax and millet. Compound 6718 showed good defoliant activity on cotton (61% defoliation at 8 lbs./acre and 84.6% defoliation at 2 lbs./acre.

The compounds are particularly valuable as nematocides against both saprophytic and parasitic nematodes. Compound 7059 was outstanding against parasitic nematodes.

The pesticides, defoliants and desiccants of the present invention can be used alone or they can be applied together with inert solids to form dusts, or can be dispersed in a suitable liquid dilute, e.g., organic solvents or water. There can also be added surface active agents or wetting agents and/or inert solids in the liquid formulations. In such case, the active ingredient can be from 0.01 to 95% by weight of the entire composition.

As organic solvents there can be employed hydrocarbons, e.g., benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., methanol, ethanol, isopropanol, amyl alcohol, ethylene glycol, propylene glycol, butyl carbitol acetae and glycerine. Mixtures of water and organic solvents, either as solutions or emulsions, can be employed.

The novel pesticides can also be applied as aerosols, e.g., by dispersing them in air by means of a compressed gas such as dichlorodifluoromethane or trichlorofluoromethane and other Freons and Genetrons, for example.

The pesticides of the present invention can also be applied with adjuvants or carriers such as talc, pyrophylite, synthetic fine silica, attapulgus clay, kieselguhr, chalk, diatomaceous earth, lime, calcium carbonate, bentonite, fuller's earth, cottonseed hulls, wheat flour, soybeans flour, pumice, tripoli, wood flour, walnut shell flour, redwood flour and lignin.

As stated, it is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkylaryl polyether alcohols, fatty acid esters of polyhydric alcohols and the alkylene oxide addition products of such esters, and addition products of long chain mercaptans and alkylene oxides. Typical examples of such surface agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, di (2-ethylhexyl) ester of sodium sulfosuccinic acid, sodium lauryl sulfate, sodium decane sulfonate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g., Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), polyethylene glycol esters of tall oil acids, sodium octyl phenoxyethoxyethyl sulfate, tri (polyoxyethylene) sorbitan monostearate (Tween 60), and sodium dehexyl sulfosuccinate.

The compounds of the present invention were tested as fungicides in agar plate tests using potato dextrose agar as the culture medium. In Table 2, CU stands for *Ceratocystis ulmi*, Col for *Colletotrichum obiculare*, F.L. for *Fusarium lycopersici*, H for *Helminthosporium sativum*, R for *Rhizovtonia solani*, V for *Verticillium spp.*

The inhibition of growth of the fungi is recorded on a 0 to 10 scale with 0 indicating no inhibition and 10 indicating complete inhibition. In the table, Rate A is 500 p.p.m., Rate B is 100 p.p.m. and Rate C is 10 p.p.m.

The compounds which were not effective at the indicated dosages can be used as fungicides at higher dosages but are not commercially attractive.

TABLE 2

| Compound | CU A | CU B | CU C | Col A | Col B | Col C | F.L. A | F.L. B | F.L. C | F.N. A | F.N. B | F.N. C | H A | H B | H C | R A | R B | R C | V A | V B | V C |
|---|---|---|---|---|---|---|---|---|---|---|---|---|---|---|---|---|---|---|---|---|---|
| 7050 | 5 | 2 | 0 | 5 | 0 | 0 | 5 | 0 | 0 | 5 | 0 | 0 | 2 | 0 | 0 | 10 | 0 | 0 | 5 | 0 | 0 |
| 7063 | 0 | 0 | 0 | 0 | 0 | 0 | 0 | 0 | 0 | 5 | 5 | 2 | 8 | 5 | 0 | 6 | 2 | 0 | 0 | 0 | 0 |
| 6718 | 5 | 0 | 0 | 10 | 0 | 0 | 5 | 0 | 0 |  |  |  | 5 | 0 | 0 | 10 | 5 | 0 | 5 | 0 | 0 |
| 7051 | 2 | 0 | 0 | 0 | 0 | 0 | 2 | 0 | 0 | 0 | 0 | 0 | 0 | 0 | 0 | 0 | 0 | 0 | 0 | 0 | 0 |
| 7058 | 5 | 0 | 0 | 0 | 0 | 0 | 5 | 0 | 0 | 5 | 0 | 0 | 0 | 0 | 0 | 0 | 0 | 0 | 0 | 0 | 0 |
| 7064 | 5 | 0 | 0 | 5 | 0 | 0 | 5 | 0 | 0 | 10 | 0 | 0 | 0 | 0 | 0 | 2 | 0 | 0 | 5 | 0 | 0 |
| 7052 | 5 | 2 | 0 | 10 | 5 | 0 | 2 | 0 | 0 | 8 | 5 | 0 | 2 | 0 | 0 | 0 | 0 | 0 | 0 | 0 | 0 |
| 7053 | 2 | 0 | 0 | 0 | 0 | 0 | 0 | 0 | 0 | 8 | 2 | 0 | 0 | 0 | 0 | 0 | 0 | 0 | 0 | 0 | 0 |
| 7054 | 5 | 0 | 0 | 5 | 0 | 0 | 2 | 0 | 0 | 10 | 0 | 0 | 0 | 0 | 0 | 0 | 0 | 0 | 0 | 0 | 0 |
| 7059 | 0 | 0 | 0 | 0 | 0 | 0 | 0 | 0 | 0 | 5 | 0 | 0 | 0 | 0 | 0 | 0 | 0 | 0 | 0 | 0 | 0 |
| 7065 | 8 | 0 | 0 | 5 | 0 | 0 | 5 | 0 | 0 | 10 | 2 | 0 | 0 | 0 | 0 | 2 | 0 | 0 | 0 | 0 | 0 |

The compounds were also tested as soil fungicides at 200 and 50 lbs./acre in *Pythium spp.* infested soil which were planted with pea seeds as the test crop. The data was recorded on a 0 to 10 scale where 0 is no control and 10 is perfect control. The results are set forth in Table 3. There is also set forth in Table 3 the results in a spore germination test employing *Alternaria spp.* spores. The procedure employed was that set forth in Aichenegg Patent 3,242,041, column 9, lines 46–61. The per cent of nongerminated spores is recorded on a 0 to 10 scale with 0 indicating complete germination, 10 indicating 100% nongermination, 8 indicating 80% nongermination. The rates were 1000 p.p.m., 100 p.p.m., and 10 p.p.m. of active ingredient.

TABLE 3

| Compound | Py 200 lb./acre | Py 50 lb./acre | Alternaria 1,000 p.p.m. | Alternaria 100 p.p.m. | Alternaria 10 p.p.m. |
|---|---|---|---|---|---|
| 7050 | 3 | 0 | 10 | 8 | 0 |
| 7057 | 4 | 0 | 10 | 10 | 0 |
| 7063 | 0 | 0 | 10 | 8 | 5 |
| 7031 | 3 | 0 | 10 | 10 | 0 |
| 6718 | 2 | 3 | 0 | 0 | 0 |
| 7051 | 6 | 1 | 10 | 5 | 0 |
| 7058 | 0 | 0 | 10 | 8 | 8 |
| 7064 | 0 | 0 | 10 | 0 | 0 |
| 7052 | 0 | 0 | 10 | 0 | 0 |
| 7053 |  |  | 10 | 10 | 5 |
| 7054 | 2 | 0 | 10 | 5 | 0 |
| 7059 | 0 | 0 | 0 | 0 | 0 |
| 7065 | 0 | 0 | 10 | 0 | 5 |
| 7055 | 2 | 2 | 10 | 10 | 10 |

The compounds of the present invention are of primary importance as nematocides. However, there is no correlation between nematocide activity and fungicide activity. Thus, Compound 7059 which showed outstanding activity as a parasitic nematocide showed very slight activity as a fungicide in the plate test (note Table 2) and no fungicide activity in the soil fungicide and spore germination tests (Table 3) at the dosages employed.

It should also be noted that there is not complete correlation between saprophytic and parasitic nematocide results. Thus, while Compound 7059 was the best parasitic fungicide tested, many of the compounds were better saprophytic fungicides.

The saprophytic nematode tests were carried out in water as the medium with Panagrellus and Rhabditis spp. at room temperature. The results are recorded as percent kill at indicated dosages in parts per million of active ingredient after a 4 day incubation period. A 10% kill is merely the same amount of kill as occurs with a blank sample. The compounds were formulated as wettable powders consisting of 50% of the compound being tested, 46% Hi-Sil 233 (ultrafine silica), 2% Maresperse N (sodium lignin sulfonate) and 2% Pluronic L-61 (polyethylene oxide-propylene oxide molecular weight about 1000). This wettable powder is hereinafter designated as Formulation A. The results are set forth in Table 4.

TABLE 4

| Compound | NESA at p.p.m. 400 | NESA at p.p.m. 200 | NESA at p.p.m. 25 |
|---|---|---|---|
| 7050 | 100 | 50 | 10 |
| 7030 | 100 | 50 | 10 |
| 7057 | 80 | 80 | 10 |
| 7063 | 100 | 100 | 80 |
| 7031 | 100 | 100 | 10 |
| 6718 | 80 | 80 | 80 |
| 7051 | 50 | 50 | 10 |
| 7058 | 80 | 50 | 10 |
| 7064 | 100 | 80 | 30 |
| 7052 | 10 | 10 | 10 |
| 7053 | 10 | 10 | 10 |
| 7054 | 100 | 80 | 10 |
| 7059 | 100 | 80 | 10 |
| 7065 | 100 | 100 | 100 |
| 7055 | 10 | 10 | 10 |

Those compounds which were ineffective at the test dosages could be employed as nematocides at higher dosages but obviously are not commercially attractive.

The compounds were also tested as parasitic nematocides employing Formulation A. The nematode employed was Meloidogyne spp. and the procedure was a 10 day contact test carried out in a water-agar medium in the presence of tomato roots at room temperature. The results are given on a 0 to 10 scale where 0 indicates the presence of severe knotting, i.e., no effectiveness, and 10 indicates no knots, i.e., 100% effectiveness. Compound 7059 was so effective it was employed in a secondary screening test. In Table 5 the rates of application are in parts per million.

TABLE 5—NEPA

| Compound | Primary 200 | Primary 20 | Secondary 100 | Secondary 50 | Secondary 25 | Secondary 12.5 | Secondary 12 | Secondary 6 | Secondary 3 |
|---|---|---|---|---|---|---|---|---|---|
| 7050 | 0 | 0 |  |  |  |  |  |  |  |
| 7030 | 0 | 0 |  |  |  |  |  |  |  |
| 7057 | 0 |  |  |  |  |  |  |  |  |
| 7063 | 0 | 0 |  |  |  |  |  |  |  |
| 7031 | 0 |  |  |  |  |  |  |  |  |
| 6718 | 0 | 0 |  |  |  |  |  |  |  |
| 7051 | 10 | 0 |  |  |  |  |  |  |  |
| 7058 |  | 0 |  |  |  |  |  |  |  |
| 7064 | 10 |  |  |  |  |  |  |  |  |
| 7052 | 10 | 0 |  |  |  |  |  |  |  |
| 7053 | 10 | 0 |  |  |  |  |  |  |  |
| 7054 | 0 | 0 |  |  |  |  |  |  |  |
| 7059 | 10 | 10 | 10 | 10 | 10 | 10 | 10 | 10 | *10 |
| 7065 | 0 | 0 |  |  |  |  |  |  |  |
| 7050 | 0 | 0 |  |  |  |  |  |  |  |

*Results of three different secondary screening tests.

What is claimed is:

1. A process of killing nematodes comprising applying to the nematodes a nematocidally effective amount of a compound selected from the group consisting of (a) 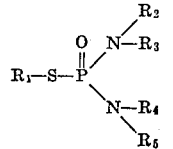

and (b)

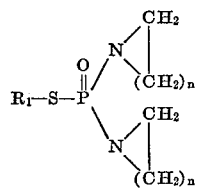

where $R_1$ is trihaloethyl or dihalovinyl, $R_2$ and $R_4$ are lower alkyl, phenyl, tolyl, naphthyl or halophenyl, $R_3$ and $R_5$ are hydrogen, lower alkyl, phenyl, tolyl, naphthyl or halophenyl and $n$ is an integer of 1 to 4 and the halogen atoms have an atomic weight of 35 to 80.

2. A process according to claim 1 wherein the compound has Formula (b), and $n$ is 1.

3. A process according to claim 1 wherein the compound has Formula (a).

4. A process according to claim 3 wherein $R_1$ is trichloroethyl and $R_2$, $R_3$, $R_4$ and $R_5$ are lower alkyl.

5. The process according to claim 3 wherein $R_1$ is trichloroethyl, $R_2$ and $R_4$ are lower alkyl and $R_3$ and $R_5$ are hydrogen.

6. A process according to claim 3 wherein $R_1$ is 2,2-dichlorovinyl and $R_2$, $R_3$, $R_4$ and $R_5$ are lower alkyl.

7. A process according to claim 3 wherein $R_1$ is 2,2-dichlorovinyl, $R_2$ and $R_4$ are lower alkyl and $R_3$ and $R_5$ are hydrogen.

8. A process according to claim 3 wherein $R_2$ and $R_4$ each have 3 carbon atoms.

9. A process according to claim 8 wherein the compound is 2,2-dichlorovinyl sulfenyl phosphor-N-monoisopropyl-bis-amidate.

10. A process according to claim 9 wherein the nematodes are parasitic nematodes.

References Cited

UNITED STATES PATENTS

| | | | |
|---|---|---|---|
| 2,988,566 | 6/1961 | Raths | 424—220 |
| 3,184,377 | 5/1965 | Hensel et al. | 424—219 |
| 3,261,743 | 7/1966 | Wilson | 424—219 |

ALBERT T. MEYERS, Primary Examiner

DAREN M. STEPHENS, Assistant Examiner

U.S. Cl. X.R.

424—200, 220